United States Patent
Uemura et al.

(10) Patent No.: US 7,186,391 B1
(45) Date of Patent: Mar. 6, 2007

(54) SINTERED COMPACT OF LANTHANUM SULFIDE OR CERIUM SULFIDE AND METHOD FOR PREPARING THE SAME

(75) Inventors: Yoichiro Uemura, Ushiku (JP); Mamoru Mitomo, Ushiku (JP); Toshiyuki Nishimura, Tsukuba (JP); Shinji Hirai, Muroran (JP); Kazuyoshi Shimakage, Muroran (JP)

(73) Assignees: Japan Science and Technology Agency, Saitama (JP); National Institute for Materials Science, Ibaraki (JP)

( * ) Notice: Subject to any disclaimer, the term of this patent is extended or adjusted under 35 U.S.C. 154(b) by 420 days.

(21) Appl. No.: 10/275,963

(22) PCT Filed: Nov. 17, 2000

(86) PCT No.: PCT/JP00/08150

§ 371 (c)(1),
(2), (4) Date: Jul. 11, 2003

(87) PCT Pub. No.: WO01/87799

PCT Pub. Date: Nov. 22, 2001

(30) Foreign Application Priority Data

May 19, 2000 (JP) ............................. 2000-152779

(51) Int. Cl.
- *C01B 17/00* (2006.01)
- *C01F 1/00* (2006.01)
- *C01F 17/00* (2006.01)
- *H01L 35/00* (2006.01)

(52) U.S. Cl. ............... 423/263; 423/415.1; 423/561.1; 423/592.1; 252/62.3 T; 252/62.3 C

(58) Field of Classification Search ............... 423/263, 423/561.1, 415.1, 592.1; 252/62.3 T, 62.3 C
See application file for complete search history.

(56) References Cited

U.S. PATENT DOCUMENTS 4,061,505 A * 12/1977 Hampl, Jr. .................. 136/238
5,032,374 A * 7/1991 Pastor et al. .............. 423/561.1
5,279,801 A * 1/1994 Colombet et al. .......... 423/21.1
5,746,990 A * 5/1998 MaCaudiere et al. ....... 423/263
5,755,868 A * 5/1998 Macaudiere ................ 106/401
2001/0038815 A1* 11/2001 Busnot et al. .............. 423/263

OTHER PUBLICATIONS

Patent Abstracts of Japan, Publication No. 08-306964, dated Nov. 22, 1996.
Shinji Hirai et al.; J. Am. Ceram. Soc., vol. 81, No. 1, pp. 145-151, 1998.
*Practical Manual for New Material Technologies*, International Trade and Industry Documentary Research Inc., 1996, p. 904. Discussed in the specification, p. 2.
G.V. Samsonov et al., *Sulfide Manual*, Japan Soviet Information Services Inc., 1974, p. 108. Discussed in the specification, p. 2.
S. Kaysuyama et al., *Phase Relation and Thermoelectric Properties of the Ternary Lanthanum Actions Chalcogenide System La-A-S(A=Ca, Ba)*, Journal of Thermoelectric Conversion Symposium '99, 1999, p. 56. Discussed in the specification, p. 2.
Hirai et al., *Synthesis of Low Oxygen $La_2O_3$ by Sulphidation of $La_2O_3$ with $CS_2$*, Summary of 124th Spring Seminar of the Japan Institute of Metals, 1999, p. 149. Discussed in the specification, p. 3.
Hirai et al., *Synthesis of γ-$La_2O_3$ and Thermoelectric Properties*, Summary of 125th Spring Seminar of the Japan Institute of Metals, 1999, p. 317.

* cited by examiner

*Primary Examiner*—Timothy C. Vanoy
(74) *Attorney, Agent, or Firm*—Westerman, Hattori, Daniels & Adrian, LLP.

(57) ABSTRACT

The present invention provides a lanthanum sulfide or cerium sulfide sintered compact usable as a thermoelectric conversion material having a high Seebeck coefficient. The sintered compact has a chemical composition of $La_2S_3$ or $Ce_2S_3$, and a crystal structure consisting of a mixture of beta and gamma phases having a Seebeck coefficient higher than that of the crystal structure otherwise being in gamma single-phase. The sintered compact is produced by preparing a beta-phase $La_2S_3$ or alpha-phase $Ce_2S_3$ powder of raw material having a high purity with a suppressed carbon impurity concentration and a given range of oxygen concentration, charging the raw material into a carbon die having an inner surface covered with an h-BN applied thereon, and hot-pressing the charged material under vacuum to form a mixture of beta and gamma phases having a high Seebeck coefficient.

9 Claims, No Drawings

SINTERED COMPACT OF LANTHANUM SULFIDE OR CERIUM SULFIDE AND METHOD FOR PREPARING THE SAME

TECHNICAL FIELD

The present invention relates to a lanthanum sulfide or a cerium sulfide sintered compact having a large thermoelectromotive force, particularly useful as thermoelectric conversion materials. The present invention also relates to a method of producing such a sintered compact.

BACKGROUND ART

A thermoelectric conversion material has a wide range of application. While the greatest expectation is directed toward use as a clean energy source for converting thermal energy to electrical energy, various other applications have been researched to utilize its Peltier effect and put to practical as small-size cooling devices, heatsinks, high-temperature baths, electrotherms and others.

Thermoelectromotive force means a voltage V arising from the temperature difference $\Delta T$ between two contact points of a pair of different electric conductors jointed together, wherein the relation between the voltage V and the temperature difference $\Delta T$ may be expressed by the formula: $V=\alpha\Delta T$. The coefficient $\alpha$ is referred to as "Seebeck coefficient". In a process of converting thermal energy to electrical energy by utilizing the thermoelectromotive force, the effectiveness of the thermoelectric conversion material is represented by use of a figure of merit Z expressed by the formula: $Z=\alpha^2\sigma/\kappa$. A higher value of Z is indicative of superiority as the thermoelectric conversion material.

Among many previously reported or available thermoelectric conversion materials, Bi—Te based substances presently exhibits the highest figure of merit of about $3\times10^{-3}$ (/K) but have a relatively small Seebeck coefficient of about 200 ($\mu$V/K) ("Practical Manual for New Material Technologies", International Trade and Industry Documentary Research Inc., 1996, p 904).

Generally, rare-earth sulfides have a large Seebeck coefficient. In this context, it has been reported that sulfide based on either one of elements from La to Nd among lanthanide (III) (II) sulfides was irreversibly transformed from orthorhombic alpha-phase which is a low-temperature stable phase to tetragonal beta-phase and further to cubic $Th_3P_4$ type gamma-phase which is a high-temperature stable phase, and in particular, $La_2S_3$ and $CeS_3$ were verified as thermoelectric conversion materials having Seebeck coefficients of +354 $\mu v \cdot deg^{-1}$ at 373 K and +574 $\mu v \cdot deg^{-1}$ at 373 K, respectively (G. V. Samsonov et al. "Sulfide Manual", Japan-Soviet Information Service Inc., 1974, p 108).

It has also been reported that lanthanum sulfides $La_{3-x}S_4$ and La-A-S (wherein A is Ca or Ba) exhibited a maximum figure of merit $2.9\times10^{-4}$(/K) (S. Katsuyama et al. "Journal of Thermoelectric Conversion Symposium '99", 1999, p 56). However, the reported Seebeck coefficient is a maximum of about 100 ($\mu$v/K).

Further, the inventors have precedently made a presentation about research findings of $Ce_2S_3$ powder including its crystal structure, chemical analytical values, grain-size distribution and others (J. Am. Ceram. Soc., 81, 1998, p 145).

DISCLOSURE OF INVENTION (Problem to be Solved by the Invention)

As seen in the aforementioned formula for evaluating the figure of merit Z of a thermoelectric conversion material, the value Z is determined by three physical properties, and the Seebeck coefficient $\alpha$ makes a greater contribution to increase of the value Z because it is raised to the second power. Thus, a substance having a higher value a would potentially achieve a superior thermoelectric material. From this point of view, the present invention is directed to provide a novel material having a higher Seebeck coefficient $\alpha$ and thereby a higher figure of merit Z.

(Means for Solving the Problem)

The inventors have reported that a beta-$La_2S_3$ (=$La_{10}S_{14}O$) single-phase could be obtained by preparing a $La_2O_3$ powder and compounding the $La_2S_3$ powder through a sulfiding method using $CS_2$ gas at a sulfiding temperature of 1023 K or more, and the oxygen concentration in the beta-phase was more reduced as the $La_2S_3$ powder is sulfided at a higher temperature, for example, down to 0.91 mass % at 1023 K (carbon impurity concentration: 0.02 mass %) and to 0.18 mass % at 1273 K, providing a constant sulfiding time of 28.8 Ks (Hirai et al. "Summary of 124th Spring Seminar of the Japan Institute of Metals", 1999, p 149).

In the same way, a cerium sulfide powder could be compounded. The obtained cerium sulfide powder was analyzed to determine its crystal structure and chemical composition by XRD method and chemical analyses, respectively. As a result, it has been verified that the obtained cerium sulfide powder was $Ce_2S_3$ having an alpha-phase crystal structure, and, for example, providing a sulfiding time of 28.8 ks and a sulfiding temperature of 973 K, the $Ce_2S_3$ had an oxygen concentration of 1.30 mass % and a carbon impurity concentration of 0.10 mass %.

Based on the above knowledge, the inventors have found that when the $La_2S_3$ or $Ce_2S_3$ powder of raw material compounded through the aforementioned $CS_2$ gas sulfiding method to have a high purity with a low carbon impurity concentration and a given range of oxygen concentration was sintered at an appropriate pressure and temperature conditions under vacuum, the crystal structure of the resulting sintered compact was composed of a mixture of beta and gamma phases having a Seebeck coefficient higher than that of the crystal structure otherwise being in gamma single-phase, and a $La_2S_3$ sintered compact or a $Ce_2S_3$ sintered compact having a significantly high Seebeck coefficient could be produced by selecting the oxygen concentration of the raw material powder and the sintering temperature condition.

According to a first aspect of the present invention, there is provided a lanthanum sulfide or cerium sulfide sintered compact having a chemical composition of $La_2S_3$ or $Ce_2S_3$, and a crystal structure consisting of a mixture of beta and gamma phases having a Seebeck coefficient higher than that of the crystal structure otherwise being in gamma single-phase.

According to a second aspect of the present invention, there is provided a lanthanum sulfide or cerium sulfide sintered compact produced by the steps of preparing a beta-phase $La_2S_3$ powder of raw material having an oxygen concentration in the range of 0.7 to 1.0 mass % or an alpha-phase $Ce_2S_3$ powder of raw material having an oxygen concentration in the range of 0.9 to 1.7 mass %, and sintering the raw material.

The lanthanum sulfide or cerium sulfide sintered compact according to the first or second aspect of the present invention may have a Seebeck coefficient of 1000 or more (μV/K) at 60° C.

According to a third aspect of the present invention, there is provided a thermoelectric conversion material comprising the above lanthanum sulfide or cerium sulfide sintered compact.

According to a fourth aspect of the present invention, there is provided a method of producing a lanthanum sulfide or cerium sulfide sintered compact, comprising the steps of preparing a beta-phase $La_2S_3$ powder of raw material having an oxygen concentration in the range of 0.7 to 1.0 mass % or an alpha-phase $Ce_2S_3$ powder of raw material having an oxygen concentration in the range of 0.9 to 1.7 mass %, charging the raw material into a carbon die having an inner surface covered with a hexagonal layered boron nitride (h-BN), and pressure-sintering the charged material in a temperature range of 1600 to 2000 K under vacuum.

In the producing method of the present invention, the beta-phase $La_2S_3$ powder of raw material is prepared to have an oxygen concentration in the range of 0.7 to 1.0 mass %. As for the alpha-phase $Ce_2S_3$ powder of raw material, it is prepared to have an oxygen concentration in the range of 0.9 to 1.7 mass %. The oxygen concentration range is defined as above by reason that the oxygen concentration of the raw material powder has an influence on single-phase formation and Seebeck coefficient. For example, providing a constant sintering temperature of 1973 K, a beta single-phase powder of starting material having an oxygen concentration of 0.18 mass % results in a gamma single-phase sintered compact, and a beta single-phase powder of starting material having an oxygen concentration of 0.91 mass % provides a sintered compact having a crystal structure consisting of a mixture of gamma and beta phases.

It is believed that the beta-phase is formed even at such a high temperature where gamma-phase is stable, by the reason that the oxygen contained in the starting material acts to allow $O^{2-}$ to be coordinated at the center of a unit lattice of a tetragonal crystal in beta-phase as with in findings in $Nd_2S_3$ or $Pr_2S_3$. If the oxygen concentration is deviated from the aforementioned range, a sufficiently increased Seebeck coefficient cannot be obtained.

An impurity concentration contained in the raw material powder also has an influence on single-phase formation and Seebeck coefficient in the sintered compact. An excessive carbon as the impurity leads to an active reaction with oxygen during sintering to cause volatilization of the carbon, resulting in inadequately reduced oxygen concentration. Preferably, the carbon impurity concentration of the raw material powder is reduced down to an amount undetectable through a measurement with a simultaneous analyzer made by LECO CO. The acceptable carbon impurity concentration is 0.1 mass % or less, preferably 0.08 mass % or less.

According to the present invention, the $La_2S_3$ and $Ce_2S_3$ sintered bodies can have maximum Seebeck coefficients of 19800 and 9700 (μV/K), respectively. A material having a Seebeck coefficient of 1000 or more (μV/K) at 60° C. has a sufficient availability for thermoelectric conversion materials. On the other hand, in a $La_2S_3$ sintered compact produced by using the same raw material powder but under different producing conditions from those of the present invention to have a crystal structure consisting of gamma single-phase, its Seebeck coefficient was +390 μv·deg$^{-1}$ at 333 K. This value is slightly increased as compared with that in the previous report (G. V. Samsonov et al. "Sulfide Manual", Japan-Soviet Information Service Inc., 1974, p 108). A $La_2S_3$ sintered compact having a crystal structure consisting of beta single-phase is a complete insulating material or nonconductor.

BEST MODE FOR CARRYING OUT THE INVENTION

In a producing method of the present invention, a $La_2S_3$ or $Ce_2S_3$ powder of starting material or raw material is prepared by sulfiding a $La_2O_3$ or $Ce_2O_3$ powder through a sulfiding method using $CS_2$ gas. Preferably, the $La_2S_3$ or $Ce_2S_3$ powder has a particle size of 70 μm or less. The presence of a particle having a particle size of greater than 70 μm causes deteriorated sintering performance. The reduced particle size has no adverse affect on the sintering performance, and thereby there is no particular lower limit of the particle size.

It is known that the oxygen concentration of the raw material powder is more reduced as it is sulfided at a higher temperature, providing a constant sulfiding time. Thus, the oxygen concentration can be controlled by adjusting the sulfiding temperature. If the prepared powder has a high oxygen concentration, a sintering temperature will be lowered.

In a process of pressure-sintering the raw material to provide a sintered compact having a crystal structure consisting of a mixture of beta and gamma phases, a die made of carbon is used and an h-BN is applied to cover over the inner surface of the die. The h-BN applied to the inner surface of the carbon die prevents carbon contained in the die from being incorporated into the sintered compact as an impurity and acts as a release agent in an operation of releasing the sintered compact from the carbon die.

Within the carbon die, the raw material is heated up to a temperature range of 1600 to 2000 K at a constant programming rate under vacuum, preferably at vacuum pressure of $3 \times 10^{-4}$ Pa or less. Subsequently, theses conditions are maintained for 0 to 2.7 ks, and then the heated material is sintered (hot pressed) by applying a pressure of 20 MPa or less to provide a densified sintered compact. A temperature and hold time during the hot pressing is selected in an appropriate range for allowing the mixture of beta and gamma phases to be formed in the sintered compact. The temperature for forming the gamma-phase without eliminating the beta-phase is in the range of 1600 to 2000 K, preferably in 1800 to 2000 K. However, the hold time should be set at an appropriate period because the beta-phase will be vanished by an excessively extended hold time at such a high temperature.

EXAMPLE 1

A $La_2O_3$ powder having a purity of 99.99 mass % and an average particle size of 1.77 μm was inserted into an electric furnace while placing it on a silica boat, and heated up to a temperature of 1073 K under an Ar atmosphere. Then, $CS_2$ gas vaporized from a $CS_2$ solution was introduced in the electric furnace by using Ar carrier gas, and the $La_2O_3$ powder was sulfided for 8 hours. After the sulfiding reaction, it was verified through an X-ray diffraction method using MgO as an internal reference that the sulfided powder had a crystal structure consisting of beta single-phase. As for the composition of the sulfided powder, rare earth metals were determined through a chelatometry, and sulfur, carbon and oxygen were determined with a simultaneous analyzer made by LECO CO. The determined composition was $La_2S_{2.83}O_{0.18}C_{0.02}$ ($O_2$: 0.76 mass %).

The sulfided powder was charged into a carbon die having an inner surface covered with an h-BN, and heated up to 1973 K while applying a pressure of 10 MPa to the powder. A sintered compact was formed under the condition that the heating operation was completed without hold time. After the sintering, it was verified through a structural analysis according to an X-ray diffraction method that the obtained sintered compact had a crystal structure consisting of a mixture of beta and gamma phases. A test sample of 3×3×5 (mm$^3$) was cut from the sintered compact, and used to measure a Seebeck coefficient in a temperature range of 273 to 473 K. The measured Seebeck coefficient at 60° C. was 19800 (μV/K).

EXAMPLE 2

A sulfided powder having a composition of $La_2S_{2.83}O_{0.18}C_{0.02}$ ($O_2$: 0.76 mass %) which had prepared under the same conditions as those in Example 1 was charged into a carbon die having an inner surface covered with an h-BN, and heated up to 1823 K while applying a pressure of 20 MPa. A sintered compact was formed while maintaining these conditions for 45 minutes. A test sample of 3×3×5 (mm$^3$) was cut from the obtained sintered compact, and used to measure a Seebeck coefficient. The measured Seebeck coefficient at 60° C. was 7000 (μV/K).

EXAMPLE 3

The same $La_2O_3$ powder as that in Example 1 was inserted into an electric furnace while placing it on a silica boat, and heated up to a temperature of 1023 K under an Ar atmosphere. Then, $CS_2$ gas vaporized from a $CS_2$ solution was introduced in the electric furnace by using Ar carrier gas, and the $La_2O_3$ powder was sulfided for 8 hours. After the sulfiding reaction, it was verified through the X-ray diffraction method that the sulfided powder had a crystal structure consisting of beta single-phase. The composition of the sulfided powder was analyzed through the same methods as those in Example 1. The determined composition was $La_{2.13}S_3O_{0.23}C_{0.01}$ (O: 0.91 mass %).

The sulfided powder was charged into a carbon die having an inner surface covered with an h-BN, and heated up to 1973 K while applying a pressure of 20 MPa. A sintered compact was formed by maintaining these conditions for 45 minutes. After the sintering, it was verified through the structural analysis according to the X-ray diffraction method that the obtained sintered compact had a crystal structure consisting of a mixture of beta and gamma phases. A test sample of 3×3×5 (mm$^3$) was cut from the sintered compact, and used to measure a Seebeck coefficient. The measured Seebeck coefficient at 60° C. was 9300 (μV/K).

EXAMPLE 4

A cerium oxide $Ce_2O_3$ powder having a purity of 99.99 mass % and an average particle size of 2.25 μm was inserted into an electric furnace while placing it on a silica boat, and heated up to a temperature of 973 K under an Ar atmosphere. Then, $CS_2$ gas vaporized from a $CS_2$ solution was introduced in the electric furnace by using Ar carrier gas, and the $Ce_2O_3$ powder was sulfided for 8 hours. After the sulfiding reaction, it was verified through the X-ray diffraction method that the sulfided powder had a crystal structure consisting of alpha single-phase. The composition of the sulfided powder was analyzed through the same methods as those in Example 1. The determined composition was $Ce_{1.65}S_{3.00}O_{0.18}C_{0.027}$ (O: 0.9 mass %, carbon: 0.1 mass %).

The sulfided powder was charged into a carbon die having an inner surface covered with an h-BN, and heated up to 1673 K while applying a pressure of 20 MPa. A sintered compact was formed by maintaining these conditions for 11 hours and then completing the heating operation. After the sintering, it was verified through the structural analysis according to the X-ray diffraction method that the obtained sintered compact had a crystal structure consisting of a mixture of beta and gamma phases. A test sample of 3×3×5 (mm$^3$) was cut from the sintered compact, and used to measure a Seebeck coefficient. The measured Seebeck coefficient at 60° C. was 9700 (μV/K).

EXAMPLE 5

The $Ce_2O_3$ powder in Example 4 was further heated at 1472 K under vacuum for 7.2 ks to form a beta single-phase. Then, the sulfided powder was charged into a carbon die having an inner surface covered with an h-BN, and heated up to 1673 K while applying a pressure of 20 MPa. A sintered compact was formed by maintaining these conditions for 11 hours and then completing the heating operation. After the sintering, it was verified through the structural analysis according to the X-ray diffraction method that the obtained sintered compact had a crystal structure consisting of a mixture of beta and gamma phases. A test sample of 3×3×5 (mm$^3$) was cut from the sintered compact, and used to measure a Seebeck coefficient. The measured Seebeck coefficient at 60° C. was 1456 (μV/K).

COMPARATIVE EXAMPLE 1

A beta single-phase powder of starting material having a composition of $La_2S_{2.83}O_{0.18}C_{0.02}$ ($O_2$: 0.76 mass %) was charged into a carbon die having an inner surface covered with an h-BN, and heated up to 1523 K while applying a pressure of 20 MPa. A sintered compact is formed by maintaining these conditions for 45 minutes and then self-cooling. After the sintering, it was verified through the structural analysis according to the X-ray diffraction method that the obtained sintered compact had a crystal structure consisting of beta single-phase. It is believed that no gamma-phase was formed due to the low sintering temperature. A test sample of the sintered compact was used to measure a Seebeck coefficient. The measured Seebeck coefficient was zero (μV/K). This means that the sample is a complete insulating material.

COMPARATIVE EXAMPLE 2

The same $La_2O_3$ powder as that in Example 1 was sulfided at a temperature of 1173 K under an Ar atmosphere for 8 hours. The composition of the sulfided powder was $La_{2.10}S_3O_{0.23}C_{0.06}$ ($O_2$: 0.94 mass %). The carbon impurity concentration of the powder was 0.18 mass %. This beta single-phase powder of staring material was charged into a carbon die having an inner surface covered with an h-BN, and heated up to 1973 K while applying a pressure of 20 MPa. A sintered compact is formed by maintaining these conditions for 45 minutes and then self-cooling.

After the sintering, it was verified through the structural analysis according to the X-ray diffraction method that the obtained sintered compact had a crystal structure consisting of gamma single-phase. It is believed that when the raw material powder contains an excessive amount of carbon, the carbon is reacted with oxygen and vaporized during the sintering to eliminate beta-phase and leave only gamma phase. The Seebeck coefficient of a sample of the sintered compact was 392 (μV/K).

COMPARATIVE EXAMPLE 3

The same powder as that in Example 4 having a composition of $Ce_{1.65}S_{3.00}O_{0.18}C_{0.027}$ (O: 0.9 mass %, carbon: 0.1 mass %) was used as a starting material. This sulfided powder was charged into a carbon die having an inner surface covered with an h-BN, and heated up to 1973 K while applying a pressure of 20 MPa. A sintered compact was formed by maintaining these conditions for 11 hours and then completing the heating operation. After the sintering, it was verified that the obtained sintered compact had a crystal structure consisting of gamma single-phase. It is believed that beta-phase was vanished due to an excessive hold time at the high temperature.

A test sample of 3×3×5 (mm$^3$) was cut from the sintered compact, and used to measure a Seebeck coefficient. The measured Seebeck coefficient at 60° C. was 234 (μV/K).

INDUSTRIAL APPLICABILITY

The $La_2S_3$ sintered compact or $Ce_2S_3$ sintered compact of present invention has a high-temperature semiconductor characteristic and a high Seebeck coefficient and thereby an excellent capability as thermoelectric conversion materials.

In addition, the $La_2S_3$ sintered compact has a high melting point of 2368±30 K and an excellent thermal-shock resistance/thermodynamic stability, which develops its potential of use as a high-clean metal melting refractory. Further, the sintered compact has a vivid yellow color and thereby its powdered product can use as colorants for plastics or paints.

As with the $La_2S_3$ sintered compact, the $Ce_2S_3$ sintered compact has a high melting point (2163±50 K) and can be used not only as colorants but also for various purposes similar to the $La_2S_3$ sintered compact.

What is claimed is:

1. A lanthanum sulfide or cerium sulfide sintered compact comprising:
    $La_2S_3$ or $Ce_2S_3$,
    wherein a crystal structure of said $La_2S_3$ or $Ce_2S_3$ is in a form of a mixture of beta and gamma phases, and Seebeck coefficient of the mixture of beta and gamma phase is higher than that of the crystal structure being in gamma single-phase.

2. A lanthanum sulfide or cerium sulfide sintered compact as defined in claim 1 produced by the steps of
    preparing a beta-phase $La_2S_3$ powder of raw material having an oxygen concentration in the range of 0.7 to 1.0 mass % or an alpha-phase $Ce_2S_3$ powder of raw material having an oxygen concentration in the range of 0.9 to 1.7 mass %, and
    sintering the raw material.

3. The lanthanum sulfide or cerium sulfide sintered compact as defined in claim 2, wherein said $La_2S_3$ powder or $Ce_2S_3$ powder of raw material has a carbon impurity concentration of 0.1 mass % or less.

4. The lanthanum sulfide or cerium sulfide sintered compact as defined in any one of claims 1 to 3, which has a Seebeck coefficient of 1000 or more (μV/K) at 60° C.

5. A thermoelectric conversion material comprising the lanthanum sulfide or cerium sulfide sintered compact as defined in any one of claims 1 to 3.

6. A method of producing a lanthanum sulfide or cerium sulfide sintered compact, comprising the steps of:
    preparing a beta-phase $La_2S_3$ powder of raw material having an oxygen concentration in the range of 0.7 to 1.0 mass % or an alpha-phase $Ce_2S_3$ powder of raw material having an oxygen concentration in the range of 0.9 to 1.7 mass %,
    charging said raw material into a carbon die having an inner surface covered with a hexagonal layered boron nitride (h-BN), and
    pressure-sintering said charged material in a temperature range of 1600 to 2000 K under vacuum within the time period in which beta-phase is not vanished.

7. The method as define in claim 6, wherein said $La_2S_3$ powder or $Ce_2S_3$ powder of raw material has a carbon impurity concentration of 0.1 mass % or less.

8. The lanthanum sulfide or cerium sulfide sintered compact defined in claim 1, wherein the sintered compact comprises $La_3S_3$.

9. The lanthanum sulfide or cerium sulfide sintered compact defined in claim 1, wherein the sintered compact comprises $Ce_2S_3$.

* * * * *